July 7, 1953 W. DOOLAN 2,644,546
SAFETY MECHANISM OR CONTROL FOR ELEVATORS
Filed Jan. 27, 1949 5 Sheets-Sheet 1

Inventor
*William Doolan*

By
*Wilfred L. Lawson*
ATTORNEY

July 7, 1953 W. DOOLAN 2,644,546
SAFETY MECHANISM OR CONTROL FOR ELEVATORS
Filed Jan. 27, 1949 5 Sheets-Sheet 2

Inventor
William Doolan
By Wilfred E. Lawson
ATTORNEY

July 7, 1953 W. DOOLAN 2,644,546
SAFETY MECHANISM OR CONTROL FOR ELEVATORS
Filed Jan. 27, 1949 5 Sheets-Sheet 3
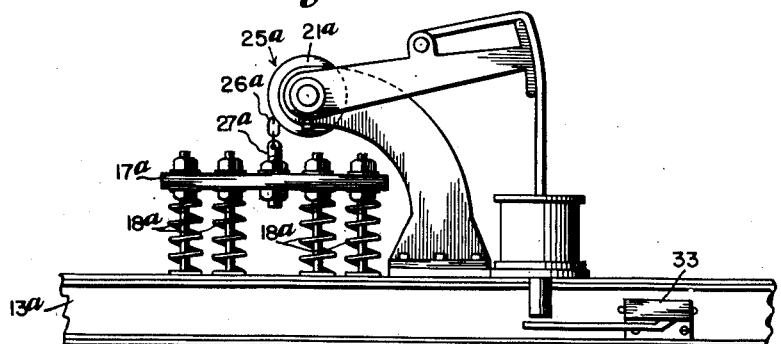
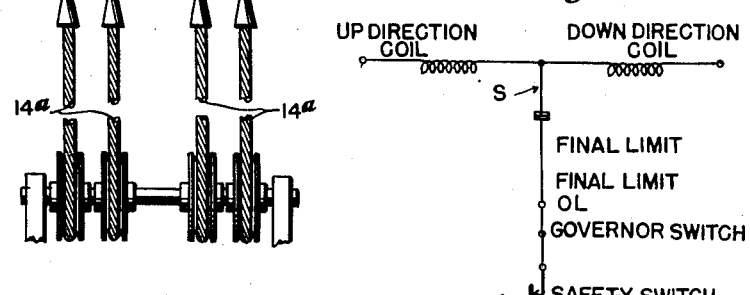
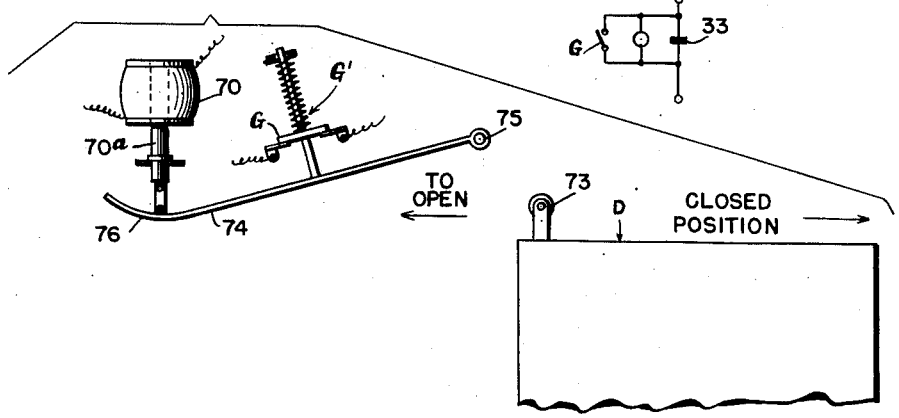
Inventor
*William Doolan*
By
*Wilfred E. Lawson*
ATTORNEY July 7, 1953  W. DOOLAN  2,644,546
SAFETY MECHANISM OR CONTROL FOR ELEVATORS
Filed Jan. 27, 1949  5 Sheets-Sheet 4
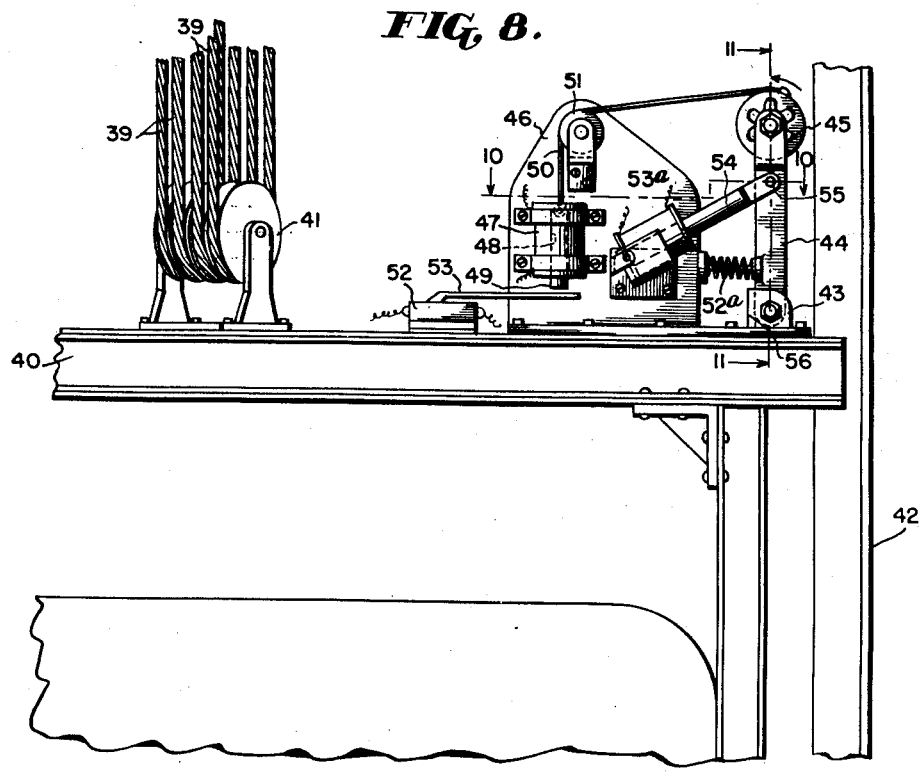
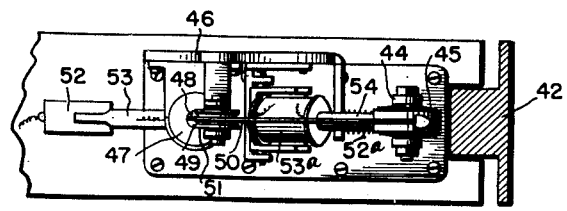
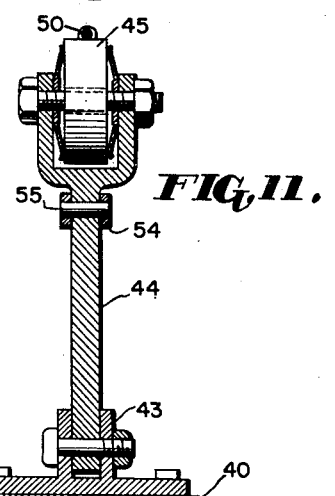
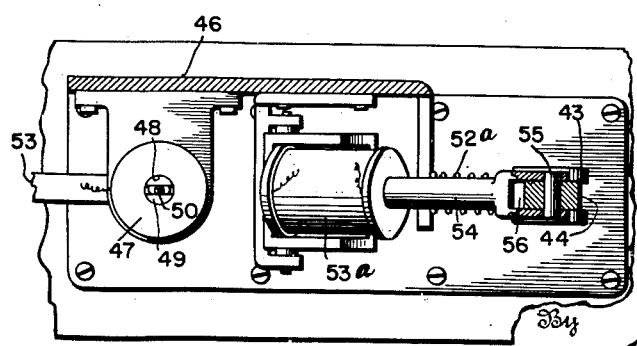
Inventor
William Doolan
Wilfred E. Lawson
ATTORNEY Inventor
*William Doolan*

By
*Wilfred E. Lawson*
ATTORNEY

Patented July 7, 1953

2,644,546

UNITED STATES PATENT OFFICE 2,644,546

SAFETY MECHANISM OR CONTROL FOR ELEVATORS

William Doolan, Washington, D. C.

Application January 27, 1949, Serial No. 73,075

12 Claims. (Cl. 187—29)

This invention relates generally to safety mechanism or controls for elevators and it is directed particularly to an improved overload warning and preventing device.

Elevator safety devices of the character at present in use are of such character that the mechanism does not come into operation until after the elevator doors are closed and the operating motor is energized so that the car is actually in motion. Under such conditions if the car is overloaded and the operating mechanism cannot support or control the load so that the car starts to move downwardly at an excessive rate of speed, such accelerated movement of the car then operates the safety mechanism to brake or completely stop the descent of the car. However, it is well known that such safety mechanism frequently fails to control the descent of the car, in which case the speed of the car downwardly gradually increases and usually the result is not only badly damaged mechanism but injury to passengers in the car or actual loss of life.

The present invention has for its principal object to provide a device or mechanism which not only will give a warning when an elevator is overloaded but functions in a manner to actually prevent the starting of the car when more than the maximum load is placed thereon thereby avoiding the possibility of subjecting the car operating mechanism or safety devices associated therewith to strains greater than the operating mechanism or other mechanism is capable of sustaining.

Another object of the invention is to provide a safety mechanism and overload warning means for an elevator, which functions as soon as the elevator car receives a greater load than the maximum which it is intended to carry, to open the safety circuit in which is located the car emergency stop switch, thus making it impossible for an operator or a passenger to put the car into motion until the load on the car is reduced to or below its rated capacity by one or more of the passengers getting off.

Still another object of the invention is to provide, in an elevator construction in which the cage is suspended by cables and intermediate shackle springs, an electrically governed safety mechanism of the character above set forth together with an electrical overload indicator connected in a balanced circuit, which balanced circuit becomes unbalanced and actuates said indicator upon the flexing of said springs as a result of and in proportion to the changes in the elevator load.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawings:

Figure 7 is a view in side elevation illustrating a modified embodiment of the invention.

Figure 8 is a view in side elevation illustrating another embodiment of the invention.

Figure 9 is a view in top plan of the embodiment shown in Figure 8.

Figure 10 is a section taken on the line 10—10 of Figure 8.

Figure 11 is a section taken on line 11—11 of Figure 8.

Figure 14 is a view illustrating diagrammatically the door switch controlling solenoid.

Figure 15 is a schematic diagram of the elevator safety circuit showing the location of the micro-switch therein.

Figure 1:
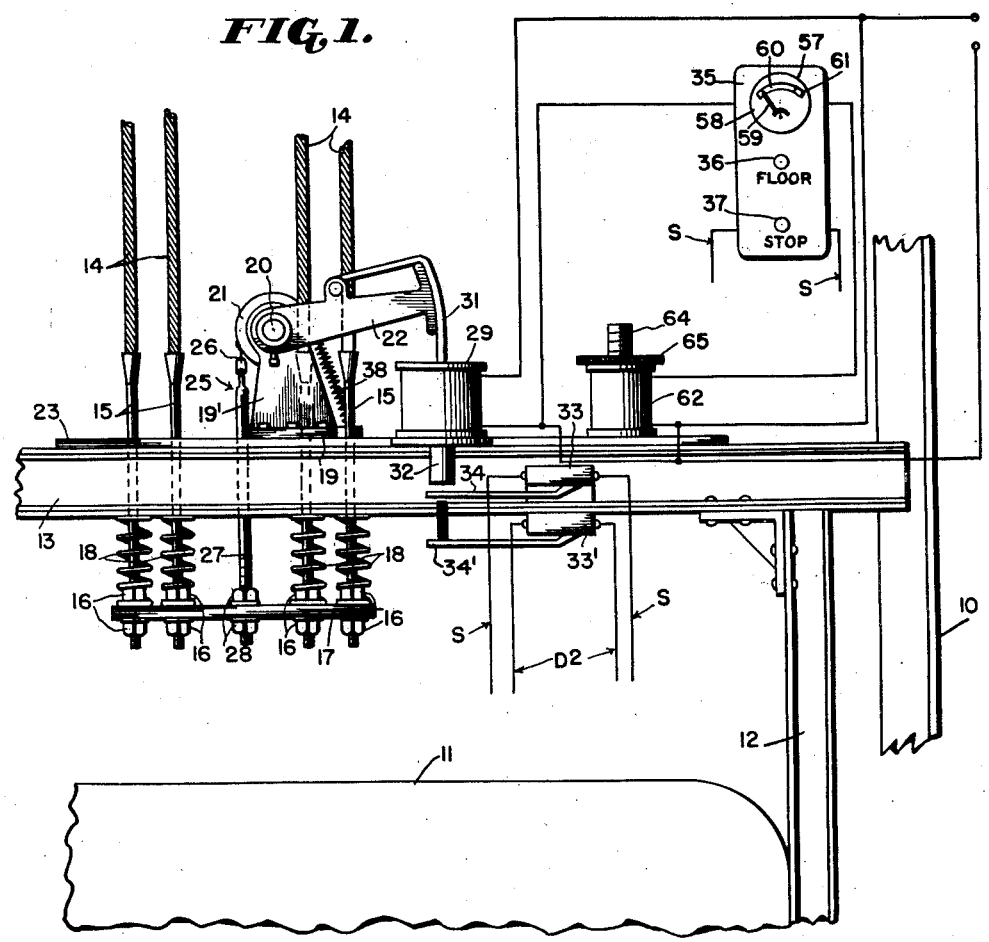
Figure 1 is a view in elevation of a preferred embodiment of the present invention the same being in part diagrammatically illustrated.
Figure 2:
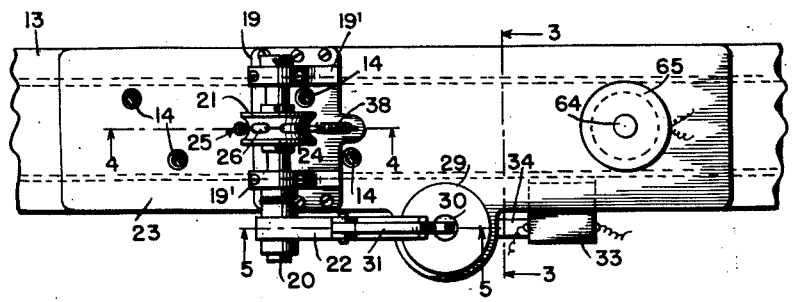
Figure 2 is a view in plan of the mechanism as illustrated in Figure 1 with the wiring removed.
Figure 3:
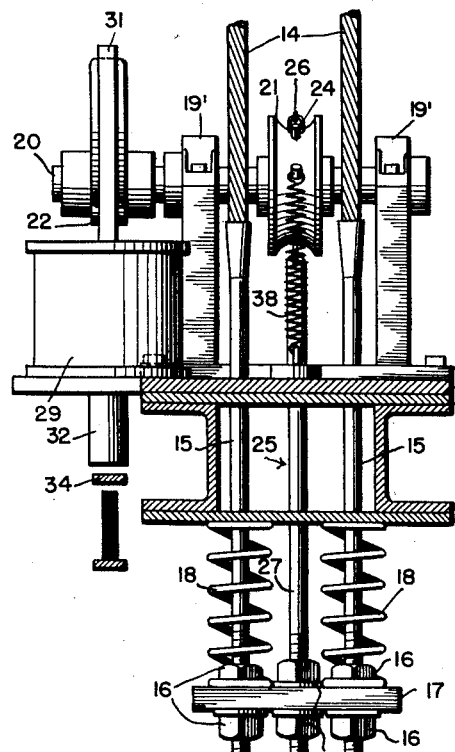
Figure 3 is a section taken substantially on the line 3—3 of Figure 2.
Figure 4:
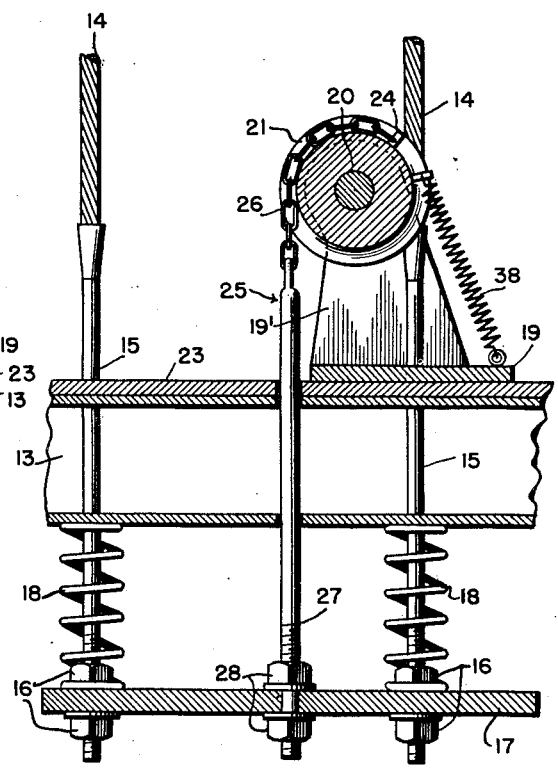
Figure 4 is a section taken substantially on the line 4—4 of Figure 2.
Figure 5:
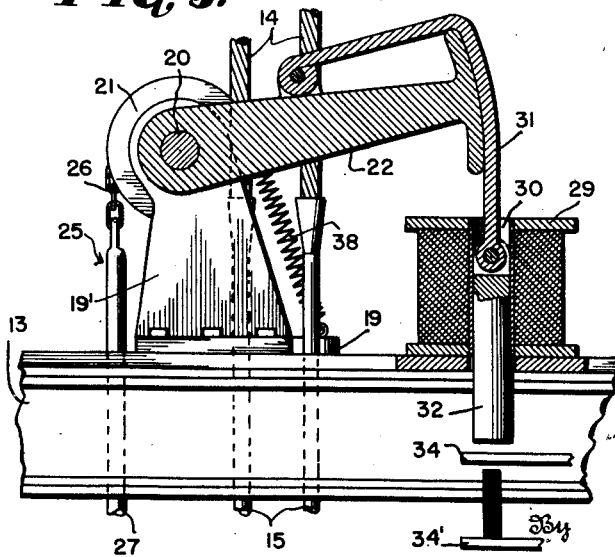
Figure 5 is a section taken substantially on the line 5—5 of Figure 2.

Referring now more particularly to the drawings, a more or less diagrammatic showing has been made of only such parts of an elevator structure as are considered necessary for proper illustration and understanding of the operation of the present invention. With reference to such parts the numeral 10 designates a portion of one of the vertical car rails which is disposed at one side of the elevator shaft, not shown, and on which the car frame runs.

The numeral 11 designates a portion of the top of the car of the elevator structure which is positioned within the usual rectangular frame, one vertical side rail of which is shown in part and designated 12 while a portion of the top beam of such frame is designated 13. The two ends of this top beam engage or slide along the car rails in the customary well known manner.

The numeral 14 designates the suspension cables for the elevator car and its frame, the lower ends of which cables are connected to the usual rods 15 which ordinarily extend through and are connected to the cross beam 13.

In accordance with one embodiment of the present invention the rods 15 are extended through the beam 13 to a substantial distance below the same and they extend through and are secured, by suitable nuts 16 threaded upon their lower ends, to the heavy steel plate 17.

Encircling the lower ends of the rods 15 and interposed between the plate and the underside of the beam 13 are the heavy steel springs or spring shackles 18 which, without the steel plate 17, are standard equipment in elevator installations. By this arrangement, as it will be readily seen, the suspension of the car by the cables is through the rods 15 to the plates 17 and through the springs 18 to the beam 13. Thus as a load is placed upon the car the springs will be slightly compressed so that there will be a slight movement between the beam 13 and the plate 17. In other words as the load increases the beam 13 and plate 17 will be forced to move toward one another and as the load decreases opposite or separatory movement will occur between these parts.

Supported in a suitable manner above and preferably directly upon the top of the beam 13 is a suitable bearing supporting unit, here illustrated as being in the form of an upstanding standard 19 having the bearings 19'. Rotatably supported in the bearings 19' is the shaft 20 upon one end of which is a pulley 21.

Secured to the opposite end of the shaft 20 is an arm 22.

The standard 19 is here shown as being secured to a plate 23 which in turn is secured in any suitable manner to the top of the beam 13, this being a preferred construction. However, it is to be understood that the invention is not restricted to this specific set-up.

Secured to the pulley 21 by means of the pin 24, or in any other suitable manner, is an end of a pull member generally designated 25 and comprising a relatively long flexible portion 26 at one end, here shown as being in the form of a chain, and a straight rod 27 to one end of which an end of the chain is attached. The other or free end of the chain 26 is connected to the pin 24 and the chain passes across the top of the pulley 21 and downwardly to the attached end of the rod 27 and the rod extends down across one side of the beam 13 as shown. The lower end of the rod 27, which is screw threaded, passes through the plate 17 and is adjustably secured thereto by means of the upper and lower nuts 28.

Disposed beneath the free end of the arm 22 is a vertical guide 29 here shown as being in the form of an electric coil or solenoid having a central passage 30 which is vertically disposed.

Suspended from the free end of the arm 22 by a suitable flexible hanger 31 which may be in the form of a flexible wire, chain, ribbon or the like of nonmagnetic material, is a relatively long round core or plunger body 32 which lies in the guide passage 30 of the element 29. This core has only a portion of its upper end lying within the passage of the coil guide body 29 as shown for the purpose hereinafter set forth and the lower end of the core or plunger 32 extends downwardly beyond the lower side of the beam 13 for the purpose about to be described.

Secured in a suitable position adjacent to the underside of the beam 13 is a switch 33, preferably of the type known as a "micro-switch," which is provided with the relatively long switch blade actuating finger 34. This finger is normally disposed in a position in which the switch 33 is closed and the free end of the finger 34 is located below and in line with the plunger 32 and is spaced therefrom so that upon a predetermined downward movement of the plunger 32, the plunger will engage the switch finger 34 and move it to switch open position.

As is well known by those persons versed in the elevator art, the electrical control mechanism includes what is known as a safety circuit which includes a normally closed emergency stop switch. Such safety circuit is, of course, in addition to the car control switch which in an operator controlled elevator is opened and closed for the starting and stopping of the car by the operator who rides thereon and in an automatic or passenger operated elevator not only controls the starting and stopping of the elevator operating motor but also controls a floor selector system whereby the elevator is brought to the stop at the desired or selected floor. In either case the passenger or car operator controlled switch energizes the electric motors which operate the proper mechanism for raising or lowering the elevator by means of the cables 14 but the car emergency stop switch in the safety circuit remains closed and is only employed when it is necessary to stop a car in an emergency and when such emergency switch button is pushed the safety circuit is opened and the car will be stopped immediately.

In Figure 1 there is shown diagrammatically a panel 35 such as is usually found in elevators of the automatic or passenger operated type and which is provided with push buttons 36 whereby the rider controls the selection of the floor to which the elevator is to be moved and an additional button 37 which controls the safety circuit opening switch or the car emergency stop switch which is diagrammatically illustrated and designated 37'.

The switch 37' represents the car emergency stop switch, and is actuated by the push button 37. This switch 37' has the normally closed "micro-switch" 33 in series therewith in the safety circuit and thus it will be understood that so long as the plunger 32 of the automatic mechanism is free from contact with the finger 34, the energization of the proper machinery to raise or lower the elevator car can be effected by the closing of a car control switch by the car operator or by a passenger pressing a floor selector button 36. If, however, a load is placed upon the elevator car which exceeds the rated capacity or safe capacity load, the support springs 18 will be compressed to such an extent that rotary movement will be imparted to the shaft 20 by the operating spring 38, connected between the shaft 20 and the base of the standard as shown, such rotary movement being permitted by reason of the upward movement of the rod 27. The chain 26 will accordingly be partly wound around the pulley 21 and as this action takes place the arm 22 will have its free end lowered so as to allow the plunger 32 to move down and engage the switch finger 34 thus opening the switch.

Thus when this occurs the safety circuit will be opened and the elevator cannot be started by the closing of the elevator control switch until the load is reduced sufficiently to permit separatory movement of the beam 13 and plate 17 to an extent to reversely turn the shaft 20 against the tension of the spring 38 and thus lift the plunger from the switch finger 34, allowing such switch to return to closed position to reestablish the safety circuit.

The invention as thus far disclosed in part has been described in association with the type of elevator structure wherein the supporting cables are connected at one end to the head beam of the car frame and are connected at their other ends with the winding mechanism at the top of the elevator shaft.

For those elevator structures of the type wherein both ends of the lifting cables are found in the machinery housing at the upper end of the elevator shaft where an end of each cable is secured to a fixed connection or dead end and the other ends are connected to the wind up machinery, the mechanism just described may be suitably rearranged to be employed at the dead ends of the cables or a slightly different embodiment of the mechanism is employed for coaction between the top cross beam of the car frame and a car rail.

In this type of elevator construction the dead ends of the lift cables are attached to a beam 13a which is disposed across the upper end of the elevator shaft and in the application of the form of the invention as just described to this second type of construction, the dead ends of the cables 14a are connected by the bolts 15a with a spring supported plate 17a which is disposed above the suspension beam and is maintained in spaced relation therewith by the heavy springs 18a. The other parts of the signal and safety mechanism are mounted upon the top of the beam in the manner illustrated and, as will be readily apparent, in a manner corresponding to the manner in which the mechanism is mounted upon the beam 13. In this latter arrangement, however, it will be seen that the plate 17a has the adjustable bolt 27a extending upwardly therefrom and the upper end of the bolt is connected to the chain 26a which passes around the pulley 21a of the control unit which is generally designated 25a. The other parts are, as will be readily seen, like the parts originally illustrated and described and accordingly it is not believed to be necessary to repeat a detailed description or operation of the same as it is thought that these will all be entirely clear.

In the second embodiment there is provided upon the beam 40 adjacent to the rail 42, a bearing 43 upon which is pivotally mounted an end of an upright arm 44. At the upper end of this arm 44 is rotatably mounted a wheel 45 and the wheel is placed in the plane of the rail 42 and is adapted to contact the adjacent edge of the rail, when the car is stationary, so that as the car becomes unloaded causing a slight downward movement of the car to take place with respect to the stationary rail 42, a slight turning movement will be given to the wheel 45.

Supported on a suitable mounting element 46, on the beam 40 and adjacent to the arm 44, is a tubular guide 47, corresponding to the guide 29 and here shown as being in the form of a solenoid coil having a vertical passage 48 therethrough.

Slidably positioned in the passage 48 is the round plunger rod 49 and the upper end of this rod is connected with an end of a flexible cable 50 which passes upwardly across the top of an idler pulley 51 and laterally to the wheel 45, to the periphery of which it is attached.

The said upper end of the cable 50 is carried over the top and partway around the wheel 45 so that as turning motion is given to the wheel in the direction indicated by the arrow, as the wheel moves down on the rail 42, a length of the cable 50 will be let off from the wheel 45 to permit the plunger 49 to move downwardly beyond the lower end of the guide member 47.

Mounted upon the beam 40 or in any other suitable manner, adjacent to the plunger 49, is the switch 52 which, like the switch 33 is normally closed and is connected in series in the car safety circuit. This switch 52 has the long actuating finger 52', the free end of which is in the path of downward movement of the plunger 49 so that when the plunger moves down to the necessary extent it will engage the finger 52' and depress it so as to open the switch 52 and thus prevent the closing of the car operating control circuit so that the car cannot be set in motion until the plunger 49 is moved back and the finger 52' is released to allow the switch to close.

Suitable means is provided for maintaining contact between the wheel 45 and the edge of the rail 42 when the car is stationary such, for example, as a spring 52a. However, when the car control switch is closed to start the elevator it is necessary that the wheel 45 be immediately moved out of contact with the rail 42 and for this purpose there is provided the electro-magnet 53 or other suitable type of electric motor, which is connected in parallel with the main drive motor circuit, not shown, by which the car is operated. Thus when the motor circuit is closed this magnet will be immediately energized and such energization will effect the movement inwardly of the core bar 54 which is connected at one end as indicated at 55 with the arm 44. Thus as soon as the motor circuit is closed and the magnet 53 becomes energized the wheel 45 will be pulled away from the rail so that no rotary movement will be given to the wheel. This movement of the wheel 45 is, of course, very slight as it is only necessary that it be sufficient to break its contact with the rail and accordingly there will not be produced sufficient slack in the cable 50 to cause the plunger 49 to open the switch 52. The extent of movement of the arm 44 under the action of the electro-magnet may be governed in any suitable manner as, for example, by the employment of a stop shoulder 56 for abutment by the back edge of the arm 44.

Figure 6:
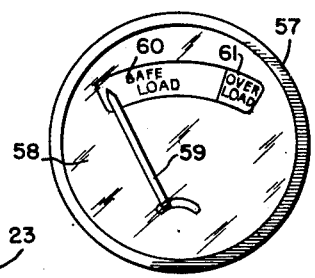
Figure 6 is a view showing the preferred design for the indicator meter.

As previously stated the guides 29 and 47 are here illustrated as being in the form of solenoid coils and these coils perform a double function in that they serve as guides for the plungers and also as a means for actuating an overload warning device which would be located within the elevator cage and a gate locking means. Such warning device would be in the form of a voltmeter (or ammeter with suitable resistance in series), the dial face of which would be suitably formed to designate by the indicating finger the presence of a safe load and of an overload. For example, Figure 6 shows a face view of an instrument of the character described, wherein the instrument is generally designated 57. The face of the dial 58, across which the indicator finger 59 moves in accordance with the intensity of the electric current passing therethrough, will be divided into the two joined arcuate portions or panels 60 and 61. The panel 60 will indicate a safe load and the panel 61, which may be suitably colored red, will indicate overload. While in the diagrammatic view forming Figure 1 a panel 35 has been illustrated upon which are shown a number of floor selector and car controlling buttons 36 thus indicating that the apparatus is associated with an automatic type of elevator, it is to be understood that the switch represented by one of the control buttons 36 may represent the manual control for a manually operated elevator and accordingly it is not believed that a separate illustration of the mechanism in association with a single switch representing a manual elevator control, need be made. However, in the automatically operated door type of elevator a slightly different circuit arrangement is employed for operating the overload indicator than is employed in the manually operated elevator and separate circuits are accordingly shown.

In the circuit set forth in Figure 15 which is associated with the automaticlly operated doors and push button type elevator, the reference S generally designates the safety circuit. This circuit is of standard well known character and it has as an element therein the emergency stop switch 37'. Other elements in this safety circuit, which is not believed to be necessary to illustrate or refer to in detail by reference characters, are final limit switches, governor switch, gate switch etc.

The switch 33 is connected in series in the safety circuit and is bridged or shunted by the gate switch which is designated G. In parallel with the gate switch is an indicator light L.

The reference character C represents a balanced circuit controlled by the solenoid coils 29 and 62. The coil 69, as previously described, has the plunger 32 therein, which plunger, on overload of the elevator car is allowed to descend through the coil to open the switch 33.

A suitable source of A. C. at approximately 115 volts is connected in the circuit C as indicated at P.

The coils 29 and 62 are connected in parallel as illustrated and in series with each of the coils in a resistance R. These resistances are of equal value and the solenoid coils 29 and 62 are of equal impedance.

Connected in a bridge circuit between the ends of the coils 29 and 62 where they connect with the resistances R is the voltmeter indicator 57 and in one side of the circuit C head of the coil 62 is a minimum weight switch 63.

The coil 62 is employed as the tuning coil for balancing the circuits to set the indicator 57 at zero when the plunger 32 is in its normal raised position in the coil 29. For this purpose the coil 62 is provided with the plunger 64 which is externally screw threaded and threaded on this plunger is the adjusting nut 65 which rests upon the top of the coil as shown in Figure 1 so that the core or plunger 64 can be raised or lowered as desired.

Figure 13:
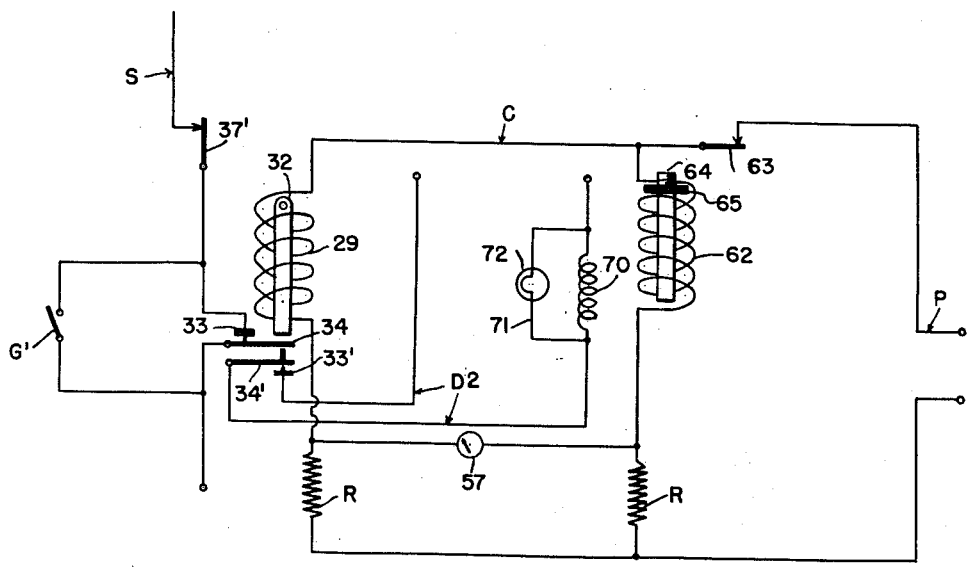
Figure 13 is a diagram of the circuit for the mechanism as employed in association with a manually operated or controlled elevator.

In the operation of the mechanism when the circuit of Figure 13 is employed therewith or, in other words, when the mechanism is employed in a push button type elevator having an automatically operated door, when no overload is upon the elevator the plunger or core 32 of the coil 29 will be maintained in elevated position and the current flow through the bridging circuits in which the coils 29 and 62 are connected will remain balanced so that the indicator 57 will indicate "safe load." The switch will, of course, be closed and while the doors of the automatic elevator are opened the gate switch G will also be opened but when the car starting switch is closed and the automatic mechanism functions to close the car door or gate, such operation of the gate will close the switch G and at the same time the car will start as expected.

If under the foregoing conditions the weight on the car is just slightly below the maximum, jolting of the car might cause the core or plunger 32 to strike the switch arm 34 and open the switch but this will not open the safety circuit because of the closed gate switch G which bridges the switch.

As the loading of the elevator proceeds the plunger or iron core 32 of the coil 29 will be gradually lowered through the coil and thus the balance of the parallel circuits in which the coils 29 and 62 are connected, will be altered and such alternation or change will be indicated by the signal meter 57. If such loading continues to the unsafe point the meter hand will be swung to a position to overlie the portion of the dial marked overload and at the same time the plunger 32 will be lowered to a sufficient extent to engage the switch arm 34 so as to open the switch. When the switch is tripped in this manner the indicator light L will be thrown into series with the stop button switch or will be put in the safety circuit. Such indicator light will draw sufficient current to drop the voltage on the magnet coil of the elevator controller, preventing the car from starting or, in other words, preventing the doors from being automatically shut. Thus it will be seen that the overload preventing and warning mechanism functions only when the elevator is stationary and prevents the starting thereof.

In Figure 13 there is shown the circuit arrangement by which the indicator 57 is made operative and also the door or gate cannot function to close the gate switch which in this circuit is designated G1.

In this circuit arrangement a second "Micro-Switch" is employed which is shown in Figure 1 and is generally designated 33'. This second switch is of the normally opened type and has a control finger 34'. The finger 34' is positioned relative to the finger 34 of the switch 33 so that actuation of the switch 33 to open the safety circuit will immediately result in the actuation of the second switch 33' to close the circuit in which it is connected.

The circuit for the second switch 33' is generally designated D2 and in one side of this circuit is a solenoid coil 70 which is bridged or bypassed by the light circuit 71 in which is connected a light or other type of signal 72.

The circuit D2 controls the gate switch G1 under certain conditions as follows.

Referring to Figure 14 there is illustrated diagrammatically a door or gate D which carries at its top the customary gate switch lever operating roller or wheel 73.

Depending in the path of movement of the roller 73 is a lever 74 which is pivoted at 75, at one end, while the other end has the usual upcurved lip 76.

Upon the free end of the lever 74 is carried the solenoid core or plunger 70a which is positioned to move into the core of the coil 70.

The gate switch G1 is actuated by the lever 74 and, as shown, when the lever is down, when the car door D is closed, the connector g which bridges the terminals of the gate switch is connected across the switch terminals so that the gate switch is closed. This connector, as shown, is carried in a suitable manner by the lever 74 so that when the door D is opened and the lever 74 is raised the connector g will be shifted to break contact with the switch terminals and so open the gate switch G1.

The solenoid core 70a is so positioned when the lever 74 is down that it will be outside the field of influence of and will not be attracted by the solenoid coil 70 when the latter is energized. Thus if the finger of the switch 33 is accidentally shifted while the elevator is in operation so as to effect the closing of the switch 33', the energization of the coil 70 will not cause the lever 74 to be moved to open the safety circuit.

Figure 12:
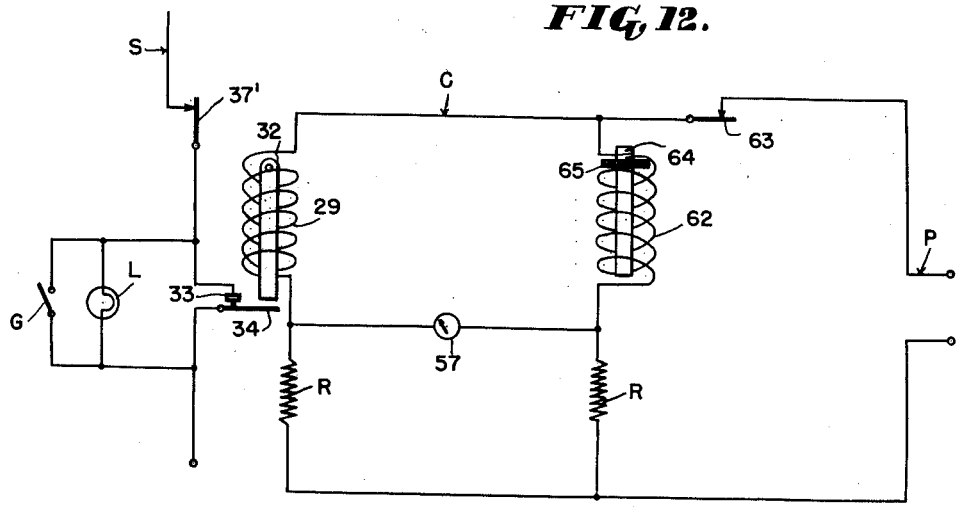
Figure 12 is a diagram of the circuit for the mechanism as employed in association with automatic push button operated elevators.

In connection with the manually operated elevator door the same meter signal mechanism may be used as shown in Figure 12 in connection with the operation of the automatically operated doors. Accordingly the same reference characters are employed since the description as given for the meter signal circuit in Figure 13 applies also to the same circuit shown in the second electric circuit diagram. It will accordingly be understood that, as illustrated in this circuit for the manually operated doors, either a light or bell signal may be employed at the position designated 72 together with the meter signal 57 or one signal only may be used if desired. If a signal is to be used at the point 72, then in place of the meter signal and the circuit shown, there would be employed only a suitable guide for the plunger 32 in substitution for the coil 29.

In the operation of the mechanism in association with the manually operated doors it will be understood that the gate switch of the safety circuit is closed upon the closing of the car door or grill. Accordingly when the car is being loaded the core 32 will be gradually lowered but if the final load upon the car is not greater than that permissible the switch 33 will not be affected and accordingly the safety circuit will remain closed even though the additional circuit is closed by the closing of the gate switch G1. If, under these conditions, the switch should be opened accidentally and the second switch accordingly closed the energization of the coil 70 will not shift the core 70a to open the gate switch, because of the fact that the core is positioned so that the magnet field of the coil 70 will not affect it.

If, before the elevator door is closed, the car is overloaded then the plunger 32 will be lowered to a point where it will open the first switch 33 and close the second switch 33'. The door being open under these conditions, the lever 74 will be raised and the plunger 70a will be positioned in the coil 70. Accordingly the closing of the second switch 33' will energize the coil 70 and the plunger will be securely held so that if the door is then closed the gate switch G1 will be held open and the safety circuit will be broken so that it will be impossible to start the car in the usual way of closing the car operating switch.

I claim:

1. In an electrically operated elevator including a cage and a member with which the cage has slight relative movement under the imposition of a load on the cage, a normally closed switch in the safety circuit of the elevator electrical system, a movable actuator in spaced relation with the switch and adapted when moved a predetermined distance in one direction to engage and open the switch, a flexible element separate and independent from the cage suspension means suspending said actuator, and means providing an operative coupling between said flexible element and the said member whereby the flexible element and actuator will be lowered upon and in direct ratio to a predetermined relative movement between the member and cage to cause the actuator to open said switch.

2. In an electrically operated elevator including a cage and a member with which the cage has slight relative movement under the imposition of a load on the cage, a normally closed switch in the safety circuit of the elevator electrical system, an element separate and independent from the elevator suspension mechanism supported for turning movement, an actuator supported for movement relative to said switch and adapted when moved to a predetermined extent in one direction to effect the opening of the switch, an operative coupling between said element and said actuator whereby turning of the element in one direction will cause the actuator to move toward the switch, and means by which a driving coupling is established between the element and said member whereby the element will be turned in the said one direction upon relative movement in one direction between the said member and the elevator cage.

3. In an electrically operated elevator including a cage, a beam disposed transversely thereof and lift cables, a plate member having the cables connected at one end thereto, springs interposed between the beam and plate whereby application of a load on the cage effects relative movement between the plate and beam, a normally closed switch in the safety circuit of the elevator electrical system, the switch having an actuating finger, a unit supported for turning movement, said unit being separate and independent from the elevator suspension mechanism, an actuator attached to said unit to be advanced toward and retracted from the switch finger on the turning of the unit, the actuator functioning on engagement with the finger to open the switch, and an operative coupling between the plate and the said unit by which turning of the unit and advancement of the actuator is effected in direct ratio to and upon movement of the plate relative to the beam under a load on the cage.

4. Mechanism of the character stated in claim 3, in which said unit comprises a shaft supported for turning movement, the said actuator being attached to the unit by an arm secured to the shaft and a flexible connection attached at one end to the arm and having the actuator attached to and suspended from its other end whereby the actuator is raised and lowered on turning of the shaft, and the said operative coupling between the plate and the unit including a flexible element attached at one end to the shaft to be wound up thereon upon the said movement of the plate relative to the beam and the actuator being simultaneously lowered for contact with said switch finger.

5. In an electrically operated elevator including a cage, a beam disposed transversely thereof and guide rails between which the cage is moved, a normally closed switch in the safety circuit of the elevator electrical system, the switch having an actuating finger, a lever arm pivotally mounted at one end upon the beam adjacent to a car rail for rocking movement toward and away from the rail, a wheel carried by the lever arm and adapted to contact the rail, an actuator for said switch supported above said finger for movement toward and away from the latter, the actuator being adapted to move into contact with the finger to open the switch, a flexible connection between the wheel and the actuator whereby rotation of the wheel in one direction will lower the actuator toward the finger, relative movement of the elevator cage and the said one car rail under the imposition of load on the cage effecting the turning of the wheel in the said one direction, and means for effecting the oscillation of the lever to move the arm out of contact wtih the rail upon the energization of the electrical system to start the elevator.

6. Mechanism of the character stated in claim 5, wherein the said means for oscillating the lever comprises an electro-magnet in circuit with the operating electric motor of the electrical system and an armature connected between the magnet and the lever to shift the lever and wheel away from the adjacent rail upon energization of the magnet.

7. In combination in an electrically operated elevator including a cage and a member with which the cage has slight relative movement under the imposition of a load on the cage, a normally closed switch in the safety circuit of the elevator electrical system, the switch including a contact element by which it is opened, a cylindrical guide member aligned with said switch contact element, an iron core plunger within the guide member and adapted when moved a predetermined distance toward the contact element to engage the latter to open the switch, an operative coupling between said plunger and said member by which free movement of the plunger into switch element contacting position is effected upon a predetermined amount of relative movement between the member and the cage, said cylindrical guide member being in the form of an electric coil, a balanced electric circuit having said coil and a second coil of equal impedance in series connection therein with series connected resistances, and an electrical signalling instrument connected across said balanced circuit between the resistances and the coils, the said plunger movement in the guide coil functioning to alter the balance of said circuit to an extent that when it engages said switch element the said electrical instrument will be actuated to a predetermined extent to give a desired signal.

8. The combination as set forth in claim 7, in an electrically operated elevator of the push button automatically operated door type, with a gate switch connected in the safety circuit in parallel with the first mentioned switch, and a resistance connected across the gate switch.

9. The combination as set forth in claim 7, in an electrically operated elevator having a manually operated door or gate, of a gate switch connected in the safety circuit in parallel with the first mentioned switch, a third switch, said third switch being normally open, means for effecting the closing of the third switch upon the opening of the first switch, an electric circuit having said third switch connected therein and including a solenoid coil, a core for the solenoid coil which is located outside of the effective field of the solenoid coil when the elevator door or gate is closed and said gate switch is closed, and means for moving the solenoid core into the solenoid coil when the elevator door or gate is opened and the door or gate switch is open.

10. In an electrically operated elevator including a cage and a member with which the cage has slight relative movement under the imposition of a load on the cage, a normally closed switch in the safety circuit of the elevator electrical system, a movable actuator positioned to engage and open said switch when moved in a predetermined distance in one direction, and an operative coupling between the actuator and said member permitting free movement of the actuator into switch opening position upon a predetermined amount of relative movement between the member and the cage, said actuator being in the form of a freely suspended member which is lowered in proportion to relative movement between said member and cage for connection with the switch.

11. In an elevator construction including a cage and frame and a member with which the cage and frame have slight relative movement upon imposition of a load on the cage, a vertical guide supported on the frame, an elongate element in and freely movable longitudinally of said guide, a flexible suspension element having an end connected with said elongate element, means operatively coupling the other end of said suspension element with said member whereby relative movement between the cage frame and member effects longitudinal movement of the elongate element in said guide, an electrical unit, and means by which said electrical unit is affected by and upon movement of said elongate element in said guide.

12. The invention according to claim 11, wherein said guide comprises a solenoid coil and said elongate element comprises an iron core, the said means comprising a balanced electric circuit having the coil and electrical unit therein.

WILLIAM DOOLAN.

References Cited in the file of this patent

UNITED STATES PATENTS

| Number | Name | Date |
| --- | --- | --- |
| 1,730,747 | Scheinfeld | Oct. 8, 1929 |
| 2,016,332 | Lee | Oct. 8, 1935 |
| 2,050,629 | Quereau et al. | Aug. 11, 1936 |
| 2,238,614 | Williams et al. | Apr. 15, 1941 |
| 2,404,415 | Turner | July 23, 1946 |